United States Patent
Kamen et al.

(10) Patent No.: US 6,386,576 B1
(45) Date of Patent: May 14, 2002

(54) CUSHION SYSTEM FOR MOBILE SUBJECT

(75) Inventors: Dean L. Kamen, Bedford; Robert R. Ambrogi, Manchester; Christopher C. Langenfeld, Nashua; Stanley B. Smith, III, Henniker, all of NH (US); Adam Epstein, Hatfield, MA (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 09/184,488

(22) Filed: Nov. 2, 1998

Related U.S. Application Data (60) Provisional application No. 60/064,175, filed on Nov. 4, 1997.

(51) Int. Cl.⁷ .............................. B60R 21/16; A61G 5/10
(52) U.S. Cl. ............................... 280/728.1; 280/304.1; 180/282
(58) Field of Search ................. 280/304.1, 730.2, 280/736, 728.1, 748; 5/424; 182/137; 297/216.1, DIG. 4; 293/132, 133, 134; 180/282

(56) References Cited

U.S. PATENT DOCUMENTS

| | | | |
|---|---|---|---|
| 3,791,669 A | 2/1974 | Hamilton | 280/150 |
| 3,822,076 A | 7/1974 | Mercier et al. | 293/1 |
| 3,840,922 A | 10/1974 | Morrison et al. | 5/350 |
| 3,907,327 A | 9/1975 | Pech | 280/150 |
| 3,975,042 A | 8/1976 | Montenare | 293/61 |
| 4,227,717 A * | 10/1980 | Bouvier | 280/753 |
| 4,275,901 A | 6/1981 | Okada | 280/741 |
| 4,877,264 A | 10/1989 | Cuevas | 280/731 |
| 5,052,065 A | 10/1991 | West | 5/424 |
| 5,129,674 A | 7/1992 | Levosinski | 280/738 |
| 5,137,295 A | 8/1992 | Peek | 280/304.1 |
| 5,207,450 A | 5/1993 | Pack, Jr. et al. | 280/738 |
| 5,295,709 A | 3/1994 | Bell | 280/734 |
| 5,301,979 A | 4/1994 | Allard | 280/737 |
| 5,458,367 A | 10/1995 | Marts et al. | 280/730.1 |
| 5,592,705 A | 1/1997 | West | 5/424 |
| 5,593,111 A | 1/1997 | Jackson et al. | 244/110 D |
| 5,669,086 A * | 9/1997 | Garman | 5/86.1 |
| 5,785,368 A | 7/1998 | Hartmann et al. | |
| 5,791,597 A | 8/1998 | Knoll | 244/121 |
| 5,802,651 A * | 9/1998 | Massey et al. | 14/71.3 |
| 6,007,090 A * | 12/1999 | Hosono et al. | 280/730.2 |

FOREIGN PATENT DOCUMENTS

| | | |
|---|---|---|
| DE | 2020 360 | 11/1971 |
| DE | 87 10 043 U | 11/1987 |
| DE | 44 41 365 A | 10/1995 |
| EP | 0 362 524 | 4/1990 |
| FR | 2 093 757 A | 1/1972 |
| GB | 1 462 125 A | 1/1977 |
| JP | 6-105415 | 12/1989 |
| WO | WO 92/09456 | 6/1992 |

* cited by examiner

*Primary Examiner*—J. J. Swann
*Assistant Examiner*—David R. Dunn
(74) *Attorney, Agent, or Firm*—Bromberg & Sunstein LLP (57) ABSTRACT

A deployable cushion mechanism for a vehicle that provides a cushion deployed in case of vehicle tipping. The cushion is inflated from a folded condition through rapid release of stored energy. Air is allowed to enter the cushion by way of valves or other orifices. Ground contact of the tipped vehicle occurs with the inflated cushion so as to prevent injury to the passenger.

11 Claims, 10 Drawing Sheets

CUSHION SYSTEM FOR MOBILE SUBJECT

The present application claims priority from U.S. provisional application number 60/064,175, filed Nov. 4, 1997, now abandoned which is herein incorporated by reference.

TECHNICAL FIELD

The present invention pertains to a deployable cushion, and, in particular, to a deployable cushion for preventing injury to the passenger of a personal vehicle.

BACKGROUND OF THE INVENTION

In the design of vehicles, stability may be traded for maneuverability and certain vehicles may, by design, lack a certain degree of stability. Vehicles of such design are susceptible to tipping, whether due to collision, mechanical failure, sudden turns on inclines, operator error, or an encounter with a surface irregularity which a stabilization mechanism is incapable of overcoming. Under these circumstances, the occupant or contents of the vehicle must be protected so that injury or damage does not result from propulsion of the occupant or contents toward the ground.

Methods are known for absorbing or diverting kinetic energy inherent in the motion of a vehicle to insure that it is not converted to propulsion of the occupant of the vehicle into a solid body such as the ground. Common examples are bumpers on cars, which absorb kinetic energy in crumpling metal, and airbags, which couple the mechanical energy of car passengers into the compression and redistribution of gas in a bag before enough time has elapsed for the bodies of the passengers to hit the steering wheel or windshield of the car with resulting serious injury.

In automobiles, pyrochemical means are used to inflate the airbag. Pyrochemical means are able to inflate the airbag extremely rapidly, but are relatively expensive and frequently use toxic chemicals. Other drawbacks include the requirement of special training and tools for service and replacement, and the danger of deployment with excessive and injury-producing force. In an unenclosed vehicle such as a wheelchair, the forcible inflation of an airbag by pyrochemical means is impractical, unsafe, and unnecessary. Other means are known to employ the kinetic energy present in a subcomponent of the vehicle, to inflate a bellows or other cushion to protect the vehicle occupants in the case of a head-on collision.

SUMMARY OF THE INVENTION

In accordance with one aspect of the invention, in one of its embodiments, there is provided a deployable cushion mechanism for protecting the passenger of a personal vehicle. The cushion mechanism has a cushion for absorbing energy that has an interior surface and is coupled to the vehicle in such a manner as to permit inflation of the cushion outward from the vehicle. The cushion mechanism also has an actuator which releases the stored energy in such a manner as to introduce air from outside the cushion to within the interior surface of the cushion. In other embodiments of the invention, the cushion also has an energy reservoir for storing energy for inflation of the cushion, and at least one orifice for enabling air flow from outside the cushion to within the interior surface of the cushion. The valve for restricting airflow such that air may flow only in the direction from outside the cushion to within the interior surface of the cushion.

In an alternate embodiment of the invention, the energy reservoir may include a spring for storing mechanical energy, and the spring may be a compressible member. In further alternate embodiments, the deployable cushion may be coupled to the vehicle to permit inflation of the cushion backward, forward, or sideward of the vehicle. In yet further alternate embodiments, the cushion includes a valve for enabling air flow from outside the cushion to within the interior surface of the cushion, a plurality of bladders for constraining lateral motion of the passenger, an air-forcing device for propelling air from outside the cushion to within the interior surface of the cushion, and an aspirator adapted for increasing the volume of gas from outside the cushion introduced to within the interior surface of the cushion. The cushion may also have a latching mechanism which may be released upon pressurization of the cushion.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

Figure 1:
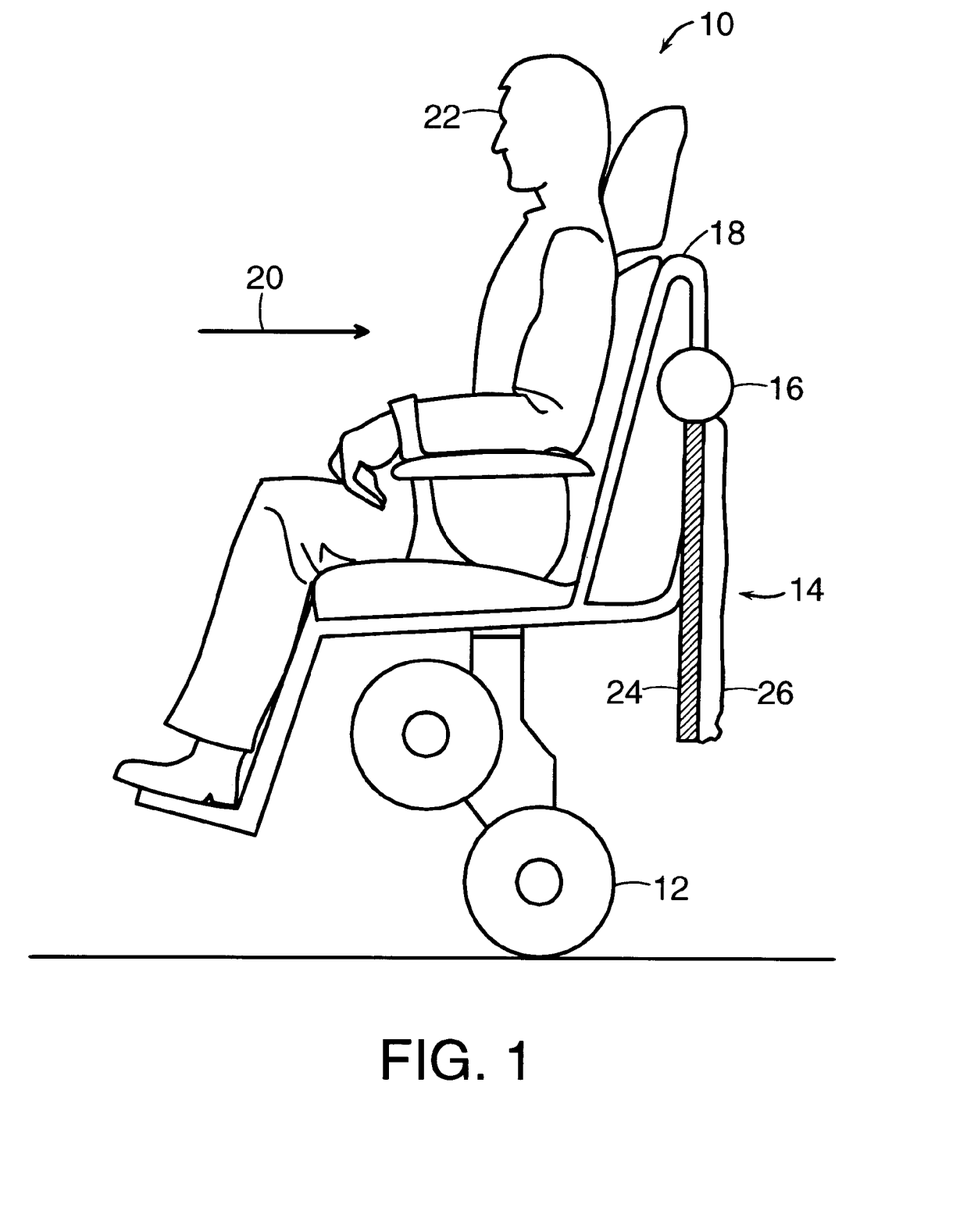
FIG. 1 is a side view of a wheelchair-type vehicle employing an embodiment of the invention wherein a deployable cushion is shown in a stowed position.

Referring now to FIGS. 1 through 5, wherein like elements are designated by identical numerals, a side-view is shown of a wheelchair-type vehicle, designated generally by numeral 10, in progressive stages of a backward-tipping motion. While the invention is applicable to many types of vehicles, the personal wheelchair-type vehicle is used, solely as an example, in the present description. One particular example of such a vehicle is described in U.S. Pat. No. 5,701,965, issued Dec. 30, 1997, which is hereby incorporated by reference. Referring, particularly, to FIG. 1, vehicle 10 is shown supported on a pair of laterally disposed wheels 12 which provide ground contact for vehicle 10. The deployable cushion mechanism which is the subject of the present invention is designated by numeral 14 and is shown in FIG. 1 in a stowed position, attached at hinge 16 to seat assembly 18. In case vehicle 10 undergoes rapid acceleration, with respect to the wheels, in rearward direction 20, it becomes necessary to protect passenger 22 from injury due to backward tipping of the vehicle. Similarly, it may be necessary to protect passenger 22 from injury due to collision or tipping in either a forward or sideward direction. In a preferred embodiment, one or more deployable cushion mechanisms 14 are attached to vehicle 10.

In FIG. 1, structural members 24 and 26 of deployable cushion mechanism 14 are shown in a retracted position, adjacent to one another. Structural members 24 and 26 are made of a stiff material such as metal, and, according to an embodiment of the invention, are held together, during routine operation of vehicle 10, against a spring force tending to separate them about hinge 16. The spring force may be provided, for example, by a coiled strip of spring metal contained within hinge 16, or otherwise as known in the mechanical arts. The potential energy of the compressed spring is but one example of a reservoir of energy used for deployment of the cushion mechanism. In another preferred embodiment of the invention, a supply of compressed gas, such as air, is provided as a reservoir both of energy and gas for the inflation of the deployable cushion mechanism.

Figure 2:
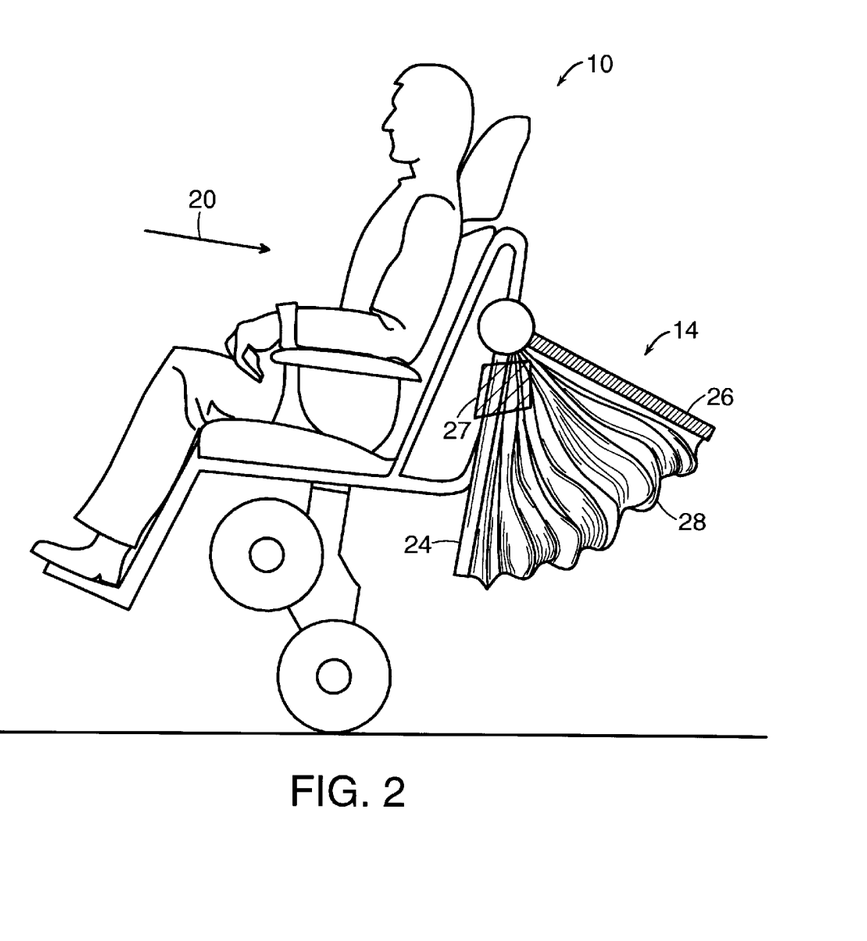
FIG. 2 is a side view of the wheelchair-type vehicle of FIG. 1, wherein the deployable cushion is shown in a partially deployed rear-facing position.

The initial stage of a backward tip, caused by an accelerating force along direction 20, is shown and now described with reference to FIG. 2. When a tilt or tilt rate is sensed, either by the controller (not shown) which monitors position angles of the wheels 12 and torques on the wheel drive motors (not shown), or else by a one of many tilt sensors known in the art, deployment of cushion mechanism 14 is initiated and the spring force is released to separate structural members 24 and 26 about hinge 16. Other structural members may also be provided. This, in turn, causes cushion 28 to unfold, and to fill with air. Air enters cushion 28 from the ambient atmosphere or from a container of compressed gas via a series of valves 40 (shown in FIG. 8). A fan 32 (shown in FIG. 8) may be used to impel air into cushion 28 while acting as a pressure regulator during deflation by helping to keep pressure in cushion 28 but allowing a substantial quantity of air to escape from the cushion, thereby providing displacement that dissipates kinetic energy. Additionally, the pressure in cushion 28 produced by inflation may be used to release a latch 27, such as a magnetic latch, that holds cushion 28 in a folded configuration. In a preferred embodiment, two flap valves are employed. The energy required to inflate cushion 28 is governed by the flow of air through valves 40.

In an alternate embodiment, cushion 28 is initially held under an internal vacuum. The sensing of a tilt or rate of tilt provides for the release of a latching mechanism, such as latch 27, which prevents the opening of valves 40 during normal operation of the vehicle.

Figure 3:
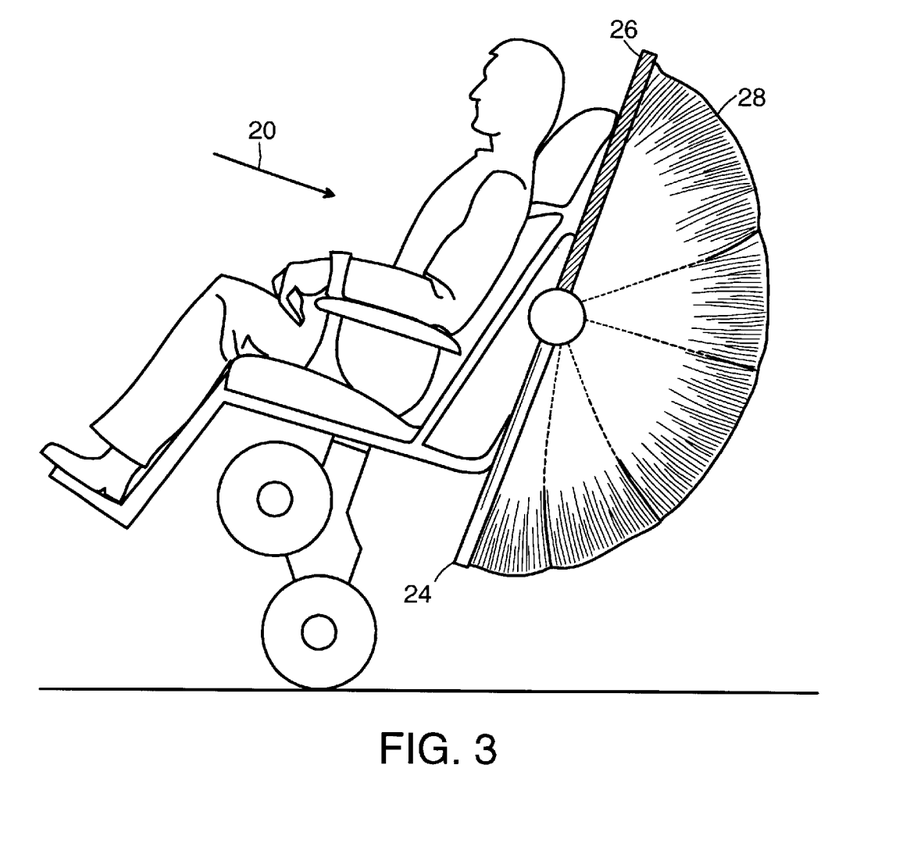
FIG. 3 is a side view of the wheelchair-type vehicle of FIG. 1, wherein the deployable cushion is shown in a deployed rear-facing position.
Figure 4:
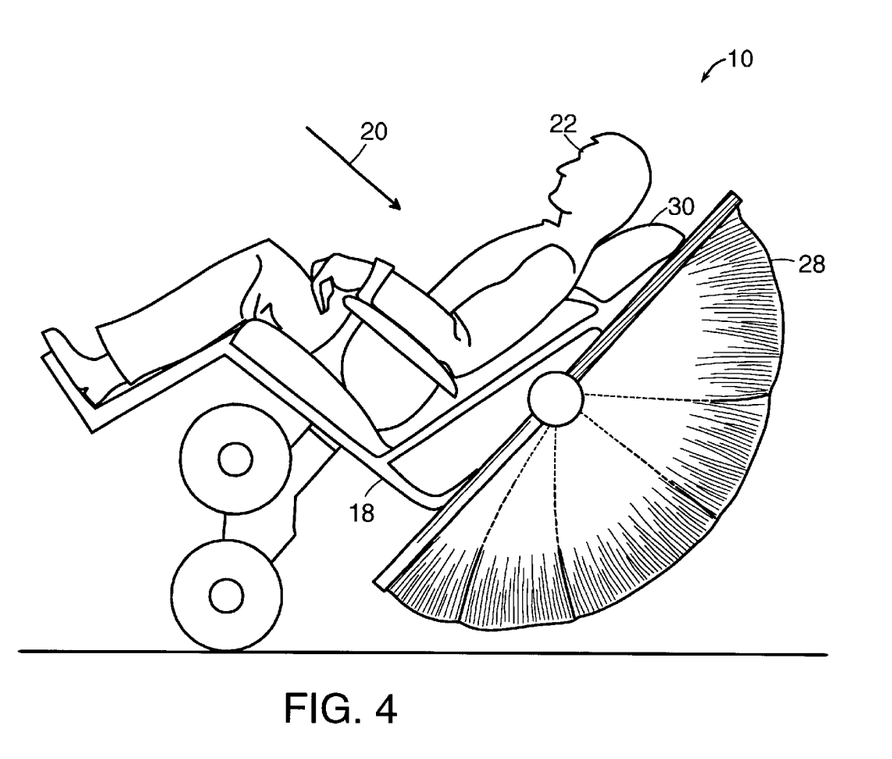
FIG. 4 is a side view of the wheelchair-type vehicle of FIG. 1, wherein the deployable cushion is shown prior to contact with the ground.
Figure 5:
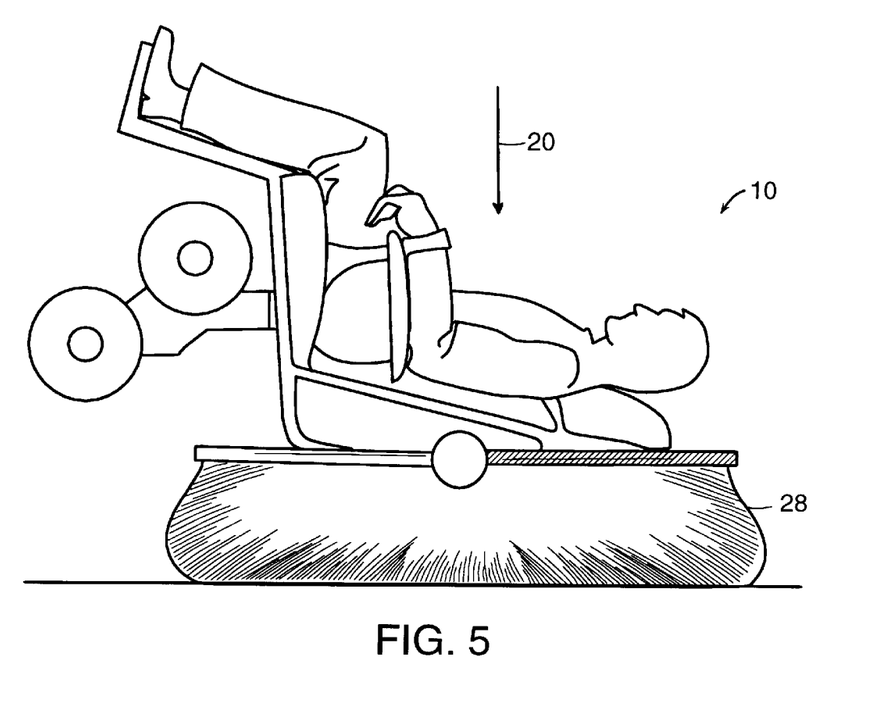
FIG. 5 is a side view of the wheelchair-type vehicle of FIG. 1, wherein the deployable cushion is shown in contact with the ground.

Referring now to FIG. 3, cushion 28 is shown fully inflated, and structural members 24 and 26 are fully separated about hinge 16. FIG. 4 shows vehicle 10 in a further state of rearward tilt towards the ground, with cushion 28 deployed to absorb the force of impact, and passenger 22 supported by seat assembly 18 and head support 30. FIG. 5 shows vehicle 10 tipped backward, with cushion 28 in contact with the ground, having absorbed the energy of impact by compressing and redistributing the air contained within cushion 28. Escape of air from the interior of cushion 28 is regulated through complete or partial closure of valves 40 (shown in FIG. 8).

Figure 6:
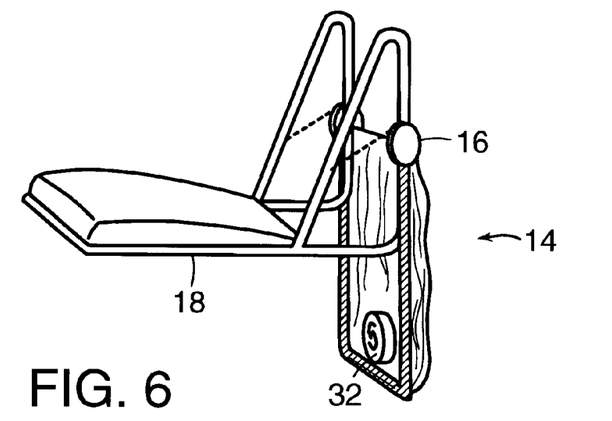
FIG. 6 is a perspective view of the deployable cushion shown in a stowed position.
Figure 7:
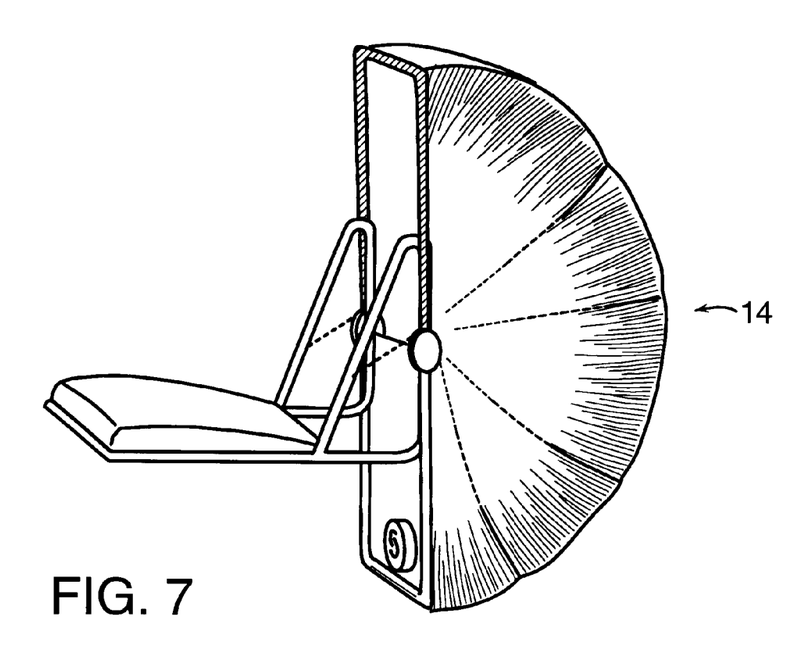
FIG. 7 is a perspective view of the deployable cushion shown in a deployed position.

FIG. 6 shows the attachment of deployable cushion mechanism 14 to seat assembly 18 at hinge 16. Deployable cushion mechanism 14 is shown here in its stowed position. An electric fan 32, provided in one embodiment, forces air into cushion 28 when a specified tilt or tilt rate is sensed and inflation of cushion 28 is initiated, in order to allow more rapid inflation than is provided through valves 40 (shown in FIG. 8). Deployable cushion mechanism 14 is shown in its deployed condition in FIG. 7.

Figure 8:
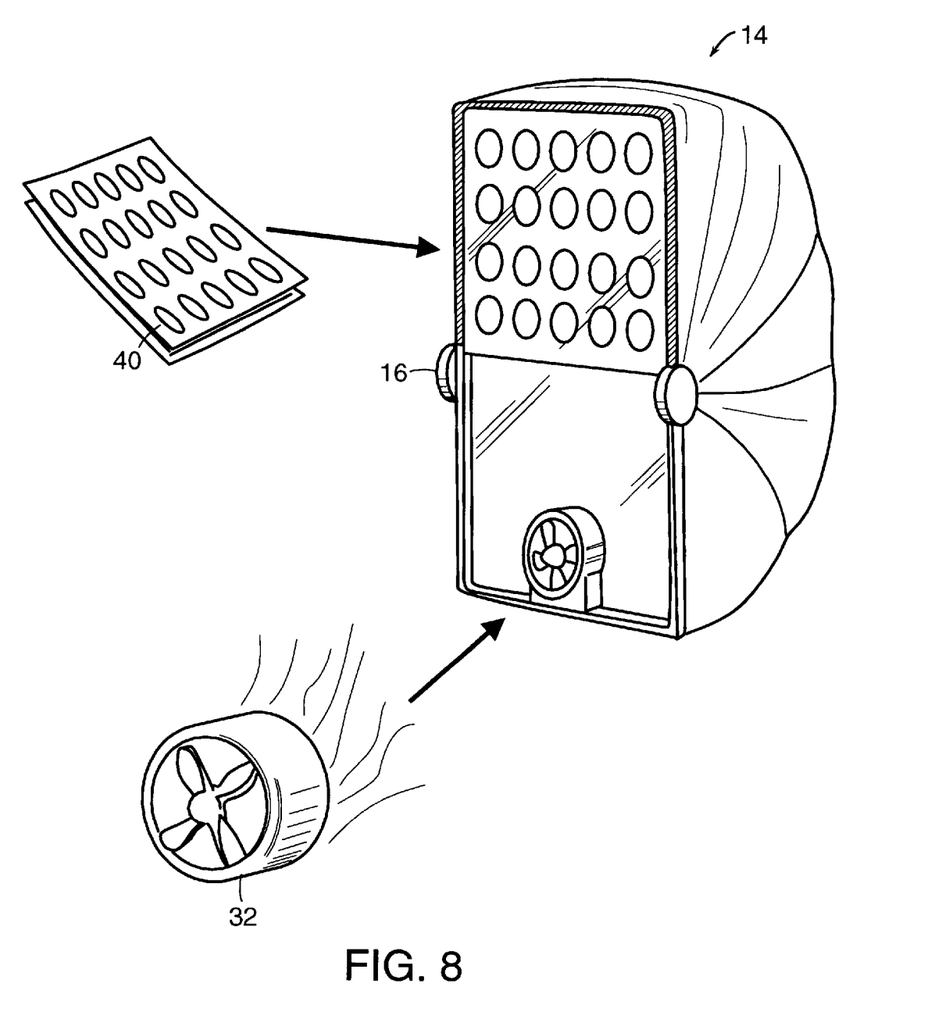
FIG. 8 is an exploded front view of an another embodiment of the invention shown in a deployed position.

Referring now to FIG. 8, deployable cushion mechanism 14 is shown in its deployed condition, showing the position of flap valves 40 and fan 32.

Figure 9:
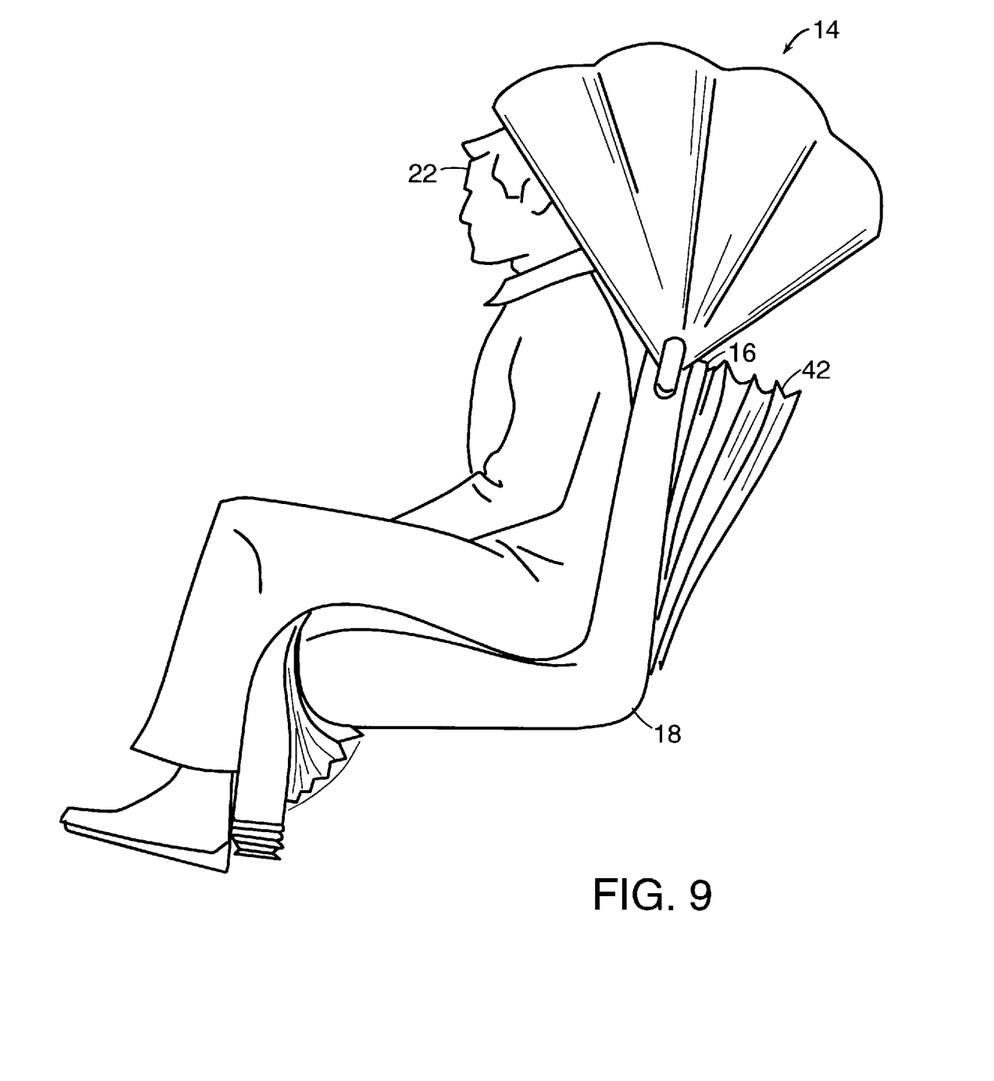
FIG. 9 is a side view of an alternative embodiment of the invention, showing a back bumper in a partially deployed position.

FIG. 9 shows an alternative embodiment of the invention, in which a back bumper 42 is shown attached to seat assembly 18. Back bumper 42 is a deployable mechanism, operating in the same manner as described above with respect to deployable cushion mechanism 14. Back bumper 42 contains one or more spring devices (not shown) which expand a bellows when an impending tip is sensed, to provide additional absorption of energy and protection for passenger 22, either instead of, or in addition to, the absorption of energy provided by deployable cushion mechanism 14. In the embodiment depicted in FIG. 9, deployable cushion mechanism 14 is shown attached to seat assembly 18 at hinge 16.

Figure 10A:
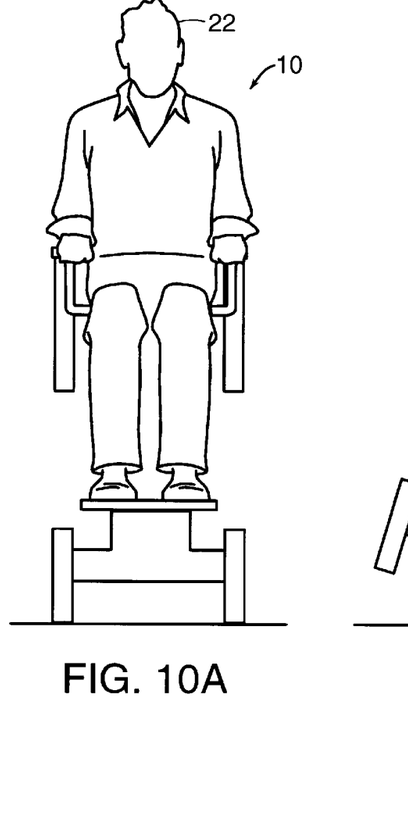
FIG. 10A is a front view of the wheelchair type vehicle of FIG. 1.
Figure 10B:
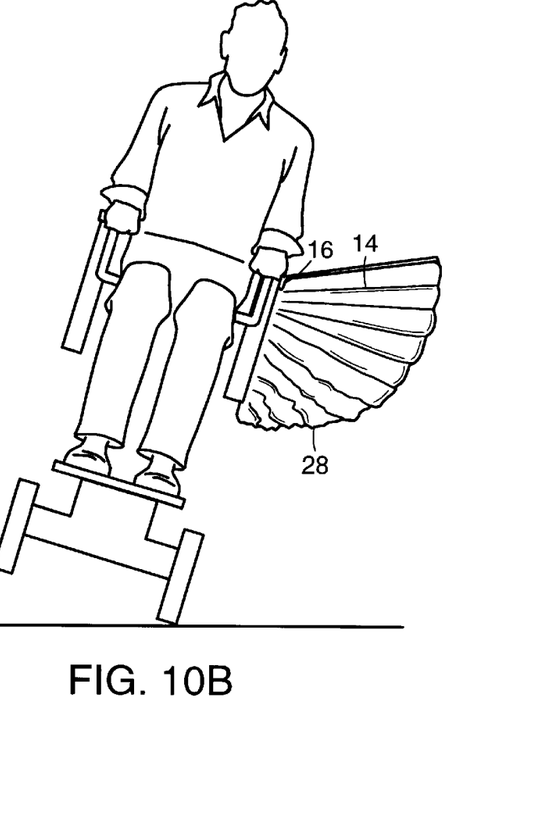
FIG. 10B is a front view of the wheelchair-type vehicle of FIG. 1 employing an embodiment of the invention, wherein a deployable cushion is shown in a partially-deployed side-facing position.
Figure 10C:
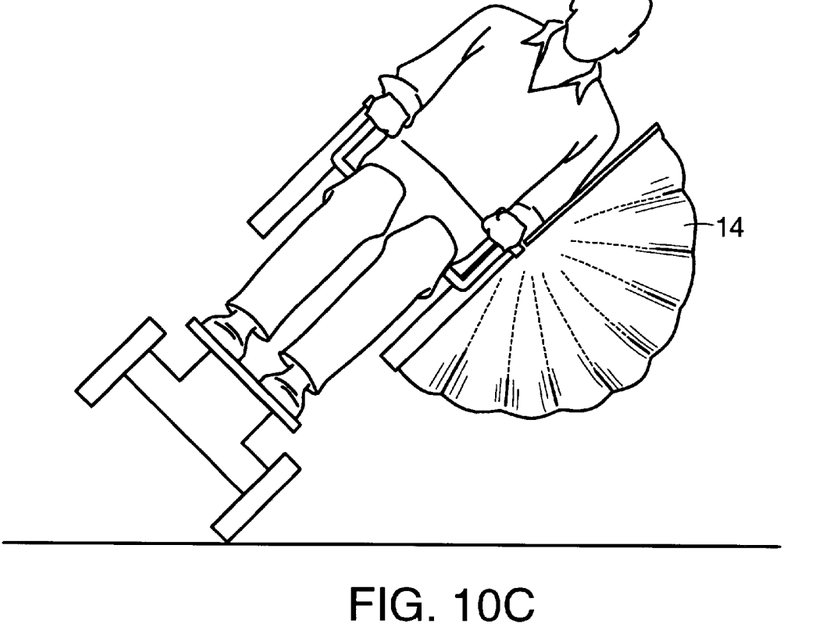
FIG. 10C is a front view of the wheelchair-type vehicle of FIG. 1 employing an embodiment of the invention, wherein a deployable cushion is shown in a fully-deployed side-facing position.
Figure 10D:
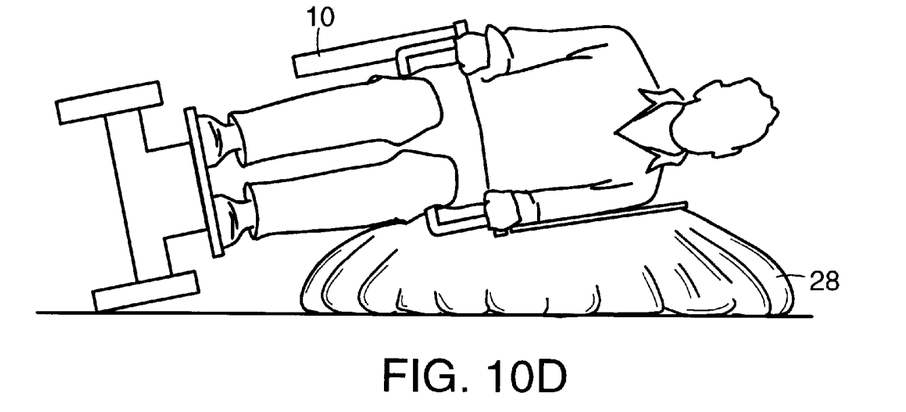
FIG. 10D is a front view of the wheelchair-type vehicle of FIG. 1 employing an embodiment of the invention, wherein a deployable cushion is shown in contact with the ground.

Referring now to FIGS. 10A–10D, in which front views are shown of wheelchair-type vehicle 10, shown, again, by way of example, although other vehicles are within the scope of the appended claims. With more particular reference to FIG. 10A, passenger 22 is shown seated in vehicle 10 during normal operation of the vehicle. The initial stage of a sideward tip, such as might be caused by a surface irregularity, is shown and now described with reference to FIG. 10B. When a tilt or tilt rate is sensed in one of the ways described above with reference to a backward tilt, deployment of cushion mechanism is initiated, and the reservoir of energy is actuated to cause cushion 28 to unfold about axis 16. Air, or another gas, is either drawn or forced into the volume within the interior surface of cushion 28. In one embodiment of the invention, an aspirator (not shown) is used to entrain an additional volume of gas, such as ambient air, in order to more rapidly fill the expanding cushion 28. FIG. 10C shows cushion mechanism 14 fully inflated. FIG. 10D shows vehicle 10 tipped fully sideward, with cushion 28 in contact with the ground, having absorbed the energy of impact by compressing and redistributing the air, or other gas, contained within cushion 28.

The described embodiments of the invention are intended to be merely exemplary and numerous variations and modifications will be apparent to those skilled in the art. All such variations and modifications are intended to be within the scope of the present invention as defined in the appended claims.

We claim:

1. A deployable cushion mechanism for protecting a passenger of an unenclosed personal vehicle, the deployable cushion mechanism comprising:

(a) a cushion for absorbing energy, having an interior surface, coupled to the vehicle in such a manner as to permit inflation of the cushion outward from the vehicle;

(b) a fan for inflating the cushion from an uninflated condition with air from outside the cushion to within the interior surface of the cushion through an orifice that permits air flow out of the cushion after inflation;

(c) an actuator for triggering, independently of the weight or position of the passenger, the introduction, from the uninflated condition of the cushion, of a gas from outside the cushion to within the interior surface of the cushion; and (d) at least one spring, disposed within the cushion, for storing mechanical energy for inflation of the cushion.

2. A deployable cushion mechanism according to claim 1, wherein the spring is a compressible member.

3. A deployable cushion mechanism according to claim 1, wherein the cushion is coupled to the vehicle to permit inflation of the cushion rearward of the vehicle.

4. A deployable cushion mechanism according to claim 1, wherein the cushion is coupled to the vehicle to permit inflation of the cushion forward of the vehicle.

5. A deployable cushion mechanism according to claim 1, wherein the cushion is coupled to the vehicle to permit inflation of the cushion sideward of the vehicle.

6. A deployable cushion mechanism according to claim 1, wherein the actuator triggers the introduction of a gas from outside the cushion to within the interior surface in response to at least one of a specified tilt and a specified tilt rate of the personal vehicle.

7. A deployable cushion mechanism according to claim 1, wherein the actuator includes a latching mechanism for retaining the cushion in an undeployed condition.

8. A deployable cushion mechanism according to claim 7, wherein the latching mechanism is a magnetic latch.

9. A deployable cushion mechanism according to claim 7, wherein the latching mechanism is released upon pressurization of the cushion.

10. A deployable cushion mechanism for protecting a passenger of an unenclosed personal vehicle, the deployable cushion mechanism comprising:

(a) a cushion for absorbing energy, having an interior surface, coupled to the vehicle in such a manner as to permit inflation of the cushion outward from the vehicle, the cushion including at least one orifice for enabling air flow in both directions between outside the cushion and within the interior surface of the cushion;

(b) a fan for inflating the cushion with air from outside the cushion to within the interior surface of the cushion through an orifice that permits air flow out of the cushion after inflation; and (c) an actuator for triggering, in response to at least one of a specified tilt and a specified tilt rate of the personal vehicle, the introduction of ambient air from outside the cushion to within the interior surface of the cushion.

11. A deployable cushion mechanism according to claim 10, wherein the cushion includes a plurality of bladders for constraining lateral motion of the passenger.

* * * * *